United States Patent
Krishna et al.

(10) Patent No.: US 9,157,826 B2
(45) Date of Patent: Oct. 13, 2015

(54) METHOD AND SYSTEM TO COMPENSATE FOR TEMPERATURE AND PRESSURE IN PIEZO RESISTIVE DEVICES

(71) Applicants: Siddhartha Gopal Krishna, Noida (IN); Chad S. Dawson, Queen Creek, TX (US); Vikram Varma, Noida (IN)

(72) Inventors: Siddhartha Gopal Krishna, Noida (IN); Chad S. Dawson, Queen Creek, TX (US); Vikram Varma, Noida (IN)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 118 days.

(21) Appl. No.: 14/197,221

(22) Filed: Mar. 5, 2014

(65) Prior Publication Data

US 2014/0182353 A1    Jul. 3, 2014

Related U.S. Application Data

(62) Division of application No. 13/077,963, filed on Mar. 31, 2011, now Pat. No. 8,701,460.

(51) Int. Cl.
*G01L 27/00* (2006.01)
*G01L 9/06* (2006.01)

(52) U.S. Cl.
CPC ............ *G01L 27/005* (2013.01); *G01L 9/065* (2013.01); *G01L 27/002* (2013.01)

(58) Field of Classification Search
CPC .................................................... G01L 27/005
USPC .......................................................... 73/1.57
See application file for complete search history.

(56) References Cited

U.S. PATENT DOCUMENTS

| | | | |
|---|---|---|---|
| 4,163,396 A | 8/1979 | Waugh | |
| 4,195,349 A * | 3/1980 | Balkanli | E21B 47/06 374/143 |
| 4,226,125 A | 10/1980 | Waugh | |
| 4,788,521 A * | 11/1988 | Johnson | G01L 9/065 338/3 |
| 5,460,049 A | 10/1995 | Kirsch | |
| 5,877,423 A * | 3/1999 | Mattsson | G01L 9/065 338/42 |
| 6,700,473 B2 * | 3/2004 | Kurtz | G01L 1/2281 338/42 |
| 6,823,711 B1 * | 11/2004 | Chen | G01L 9/085 73/1.59 |
| 7,216,554 B2 * | 5/2007 | Morikawa | G01D 3/0365 73/754 |
| 7,234,357 B2 | 6/2007 | Silverbrook | |
| 7,278,319 B2 * | 10/2007 | Johnson | G01L 9/0054 73/721 |
| 7,483,795 B2 * | 1/2009 | Miller | G01D 3/036 340/612 |
| 2006/0081062 A1 * | 4/2006 | Silverbrook | B60C 23/0408 73/754 |
| 2012/0247175 A1 * | 10/2012 | Krishna | G01L 27/002 73/1.59 |

* cited by examiner

*Primary Examiner* — Hezron E Williams
*Assistant Examiner* — Mark A Shabman
(74) *Attorney, Agent, or Firm* — Charles Bergere

(57) ABSTRACT

A method and system to calibrate temperature and pressure in piezo resistive devices for non-linear sensors having two variables, where a piezo resistive device such as a piezo resistive transducer (PRT) used for example in a pressure sensor system is calibrated to calculate actual/ambient temperature and pressure even though the PRT impedance is unbalanced relative to pressure.

7 Claims, 6 Drawing Sheets

METHOD AND SYSTEM TO COMPENSATE FOR TEMPERATURE AND PRESSURE IN PIEZO RESISTIVE DEVICES

BACKGROUND OF THE INVENTION

The present invention relates generally to pressure sensors and, more particularly, to non-linear sensors having two variables with cross-dependency.

Piezo resistive devices, such as piezo resistive transducers (PRT), are commonly used in commercial systems such as stress or pressure sensor systems. Such PRTs are typically implemented in integrated circuits and semiconductor devices. In accordance with the piezo resistive effect, the resistivity of piezo resistive elements changes in response to strain from the applied mechanical or physical stress to the piezo resistive element. In integrated circuits and semiconductor devices, the piezo resistive elements of the PRT are arranged to be in contact with a diaphragm such that a force or pressure applied to the diaphragm and the PRT converts the mechanical stress on the piezo resistive elements into differential electrical outputs. This property is used to measure ambient pressure.

The resistivity of piezo resistive elements within PRTs exhibit temperature dependency. This property is used to measure ambient temperature. If the PRT is not balanced with respect to pressure, large errors result in the computation of temperature. To minimize this pressure dependency of temperature computation, conventional PRTs are designed to be balanced with respect to pressure. However, attempting to balance a PRT with respect to pressure is difficult to achieve and places a heavy constraint on the design and manufacture of PRTs.

Thus, there is a need for a method and system of calibration of piezo resistive devices to compensate for temperature and pressure cross-dependency that addresses or at least alleviates the above issues in conventional non-linear sensors having two variables with cross-dependency.

BRIEF DESCRIPTION OF THE DRAWINGS

The accompanying drawings incorporated herein and forming a part of the specification illustrate several aspects of the present invention and, together with the description, explain the principles of the invention. While the invention will be described in connection with certain embodiments, there is no intent to limit the invention to the described embodiments. On the contrary, the intent is to cover all alternatives, modifications and equivalents as included within the scope of the invention as defined by the appended claims.

In the drawings.

DETAILED DESCRIPTION

Figure 1:
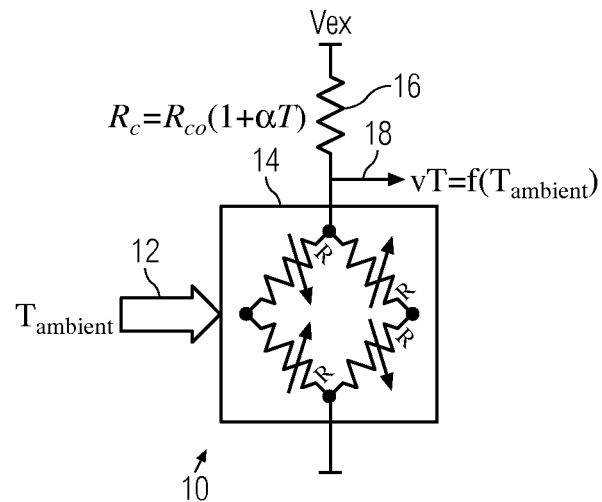
FIG. 1 is a simplified circuit diagram of a configuration for temperature measurement of an ideal piezo resistive transducer (PRT)

In one embodiment of the present invention, a method of calibrating a piezo resistive device having a piezo resistive element with a fluctuating resistivity in the piezo resistive device and signals representative of the temperature and pressure readings of the piezo resistive device includes calculating a first temperature as a function of the signal representative of temperature reading of the piezo resistive device, and calculating an actual pressure as a function of the first temperature and the signal representative of pressure reading of the piezo resistive device.

Another embodiment of the invention comprises calculating an actual temperature as a function of the first temperature and the actual pressure. The calculating of the actual temperature may be performed with a constant of the actual pressure calculated for calibrating the piezo resistive device. The constant may be determined empirically by determining a value of the constant of the actual pressure. The calculating of the first temperature may be a function of the signal representative of temperature reading and the signal representative of pressure reading. The first temperature may be an actual temperature, and calculating the actual pressure may be as a function of the actual temperature and signal representative of pressure reading of the piezo resistive device. The piezo resistive device may be arranged within a pressure sensor. The piezo resistive device may comprise at least four piezo resistive elements forming the piezo resistive device and each piezo resistive element having a fluctuating resistivity.

The present invention also provides a system of calibrating a piezo resistive device comprising a piezo resistive element having a fluctuating resistivity in the piezo resistive device; and a processor for receiving signals representative of the temperature and pressure readings of the piezo resistive device; and calculating a first temperature as a function of the signal representative of temperature reading of the piezo resistive device; and calculating an actual pressure as a function of the first temperature and signal representative of pressure reading of the piezo resistive device.

An embodiment of the invention comprises calculating an actual temperature as a function of the first temperature and the actual pressure. Calculating the actual temperature may be performed with a constant of the actual pressure calculated for calibrating the piezo resistive device. The value of the constant may be determined empirically of actual pressure readings. The calculating of the first temperature may be a function of the signals representative of temperature reading and the pressure reading. The first temperature may be an actual temperature. The calculating of the actual pressure may be as a function of the actual temperature and signal representative of pressure reading of the piezo resistive device. The piezo resistive device may be arranged within a pressure sensor. An analogue to digital converter (ADC) may convert the signals representative of temperature and pressure from the piezo resistive device and coupled to the processor. The piezo resistive device may be a piezo resistive transducer. The piezo resistive device may comprise at least four piezo resistive elements forming the piezo resistive device and each piezo resistive element having a fluctuating resistivity. The piezo resistive device may be a non-linear sensor. The piezo resistive device may have at least two variables that have cross-dependency.

A method and system is described to calibrate for temperature and pressure using piezo resistive devices. More generally, a method and system is described for non-linear sensors having two variables. A piezo resistive device such as a piezo resistive transducer (PRT) used for example in a pressure sensor system is calibrated to calculate actual/ambient temperature and pressure even though the PRT impedance is unbalanced relative to pressure.

Figure 2:
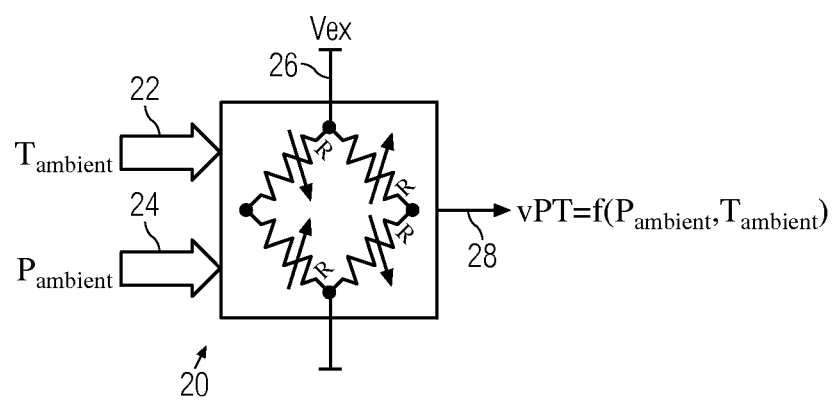
FIG. 2 is a simplified circuit diagram of a PRT configuration for pressure measurement.

Referring now to FIG. 1 and FIG. 2, basic pressure and temperature measurement configurations of piezo resistive transducers (PRT) are shown for illustration. Simplified circuit diagrams are shown of a PRT 10 with temperature input 12 in FIG. 1, and a PRT 20 with pressure input 22 and temperature input 24. In ideal PRTs, R is shown in resistor configuration 14 and is proportional to temperature, and $R_c=R_{co}(1+\alpha T)$ 16 is an on-chip resistor. vT 18, as a function of temperature ($T_{ambient}$), is used to find and compensate vPT, where vPT is proportional to pressure ($P_{ambient}$) and vPT is also a function of temperature ($T_{ambient}$), where $vPT=f(P_{ambient}, T_{ambient})$ 28 and a voltage applied, such as for example voltage $V_{ex}=1.75V$.

Figure 3:
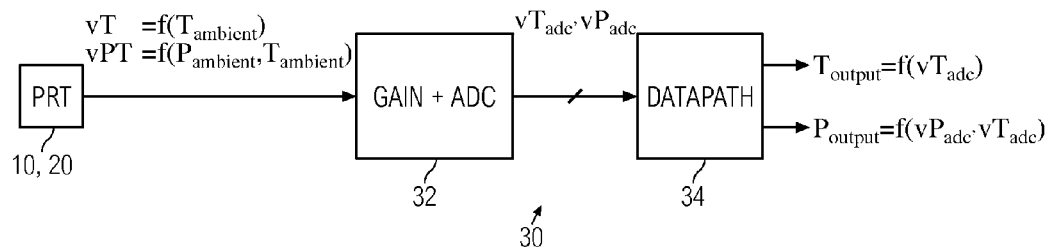
FIG. 3 is a simplified block diagram showing a pressure sensor system.

FIG. 3 is a simplified block diagram showing the basic characteristics of a pressure sensor module 30 within a pressure sensor system. The pressure sensor module comprises PRT inputs of $vT=f(T_{ambient})$ and $vPT=f(P_{ambient}, T_{ambient})$ to gain and analogue to digital (ADC) circuitry 32. The gain and ADC circuitry 32 is well known in the industry and may have different configurations. For example the ADC circuitry may be a sigma-delta A/D converter commercially available from a number of companies. The output of the gain and ADC circuitry 32, $vT_{adc}$ and $vP_{adc}$ is sent through datapath 34 for calculating $T=f(vT_{adc})$ and $P=f(vP_{adc}, vT_{adc})$. For example, $T_{output}$ could be realized as a third order equation and $P_{output}$ could be realized as a first order equation as shown below.

$$T_{output}=cT_0+cT_1 \cdot T_{adc}+cT_2 \cdot T^2_{adc}+cT_3 \cdot T^3_{adc}$$

The pressure equation may take the following form:

$$P_{output}=C_0+C_1 \cdot P_{adc}+C_2 \cdot T+C_3 \cdot P_{adc} \cdot T$$

A processing means such as an arithmetic logic unit (ALU), digital signal processor (DSP), or like processor, arranged in the datapath is used to compute the functions. It is clear from this implementation that for PRTs in which vT is strictly a function of $T_{ambient}$, the above method works well.

Figure 4:
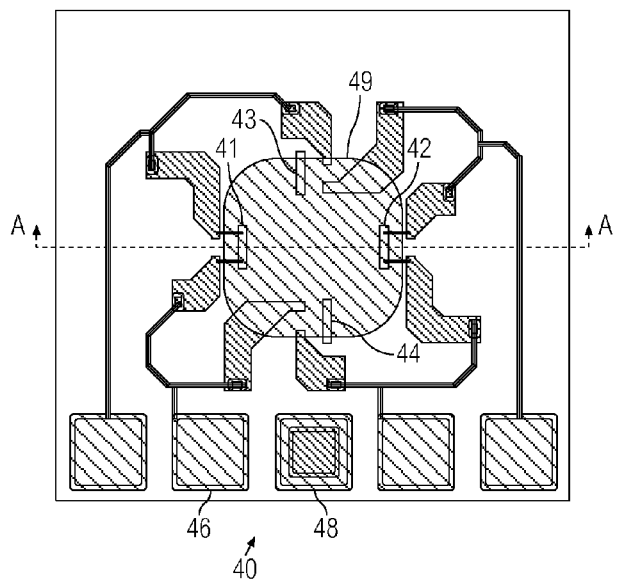
FIG. 4 is a top plan view of a circuit layout of a piezo resistive sensor in accordance with an embodiment of the invention.

FIG. 4 is a top plan view of circuit layout of a piezo resistive sensor 40 that may be implemented in accordance with an embodiment of the invention. The piezo resistive sensor 40 comprises four piezo resistors R1 41, R2 42, R3 43, R4 44 with leads 46 and circuitry 48. In this layout, the four piezo resistors are located at the edge of a diaphragm 49. The diaphragm 49 is shown transparent to show the orientation and placement of the four piezo resistors under the diaphragm. Two piezo resistors R1,R2 are arranged in a perpendicular orientation relative to the edge of the diaphragm. The other two piezo resistors R3,R4 are arranged in a parallel orientation relative to the edge of the diaphragm. The piezo resistors are sensitive to silicon strain caused by the flexing of the diaphragm.

Figure 5:
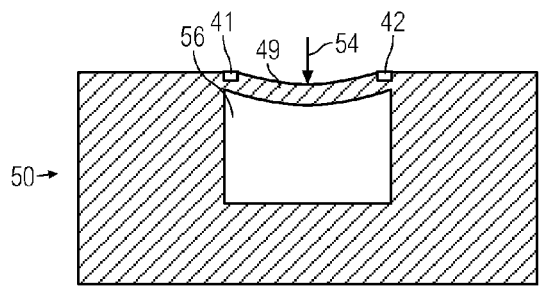
FIG. 5 is a cross-sectional view of the piezo resistive sensor of FIG. 4 taken along line A-A in accordance with an embodiment of the invention.

FIG. 5 shows a cross-section 50 of the piezo resistive sensor shown in FIG. 4 taken along line A-A and includes the cross-section of piezo resistors R1, R2. As the applied force or pressure 54 is applied to the diaphragm 49, where the diaphragm forms a vacuum 56, the resistance in piezo resistors R1,R2 increases due to the tensile stress in that direction. The piezo resistors R3, R4 with the parallel orientation relative to the diaphragm 49 decrease in resistance due to the compressive stress in that direction.

Figure 6:
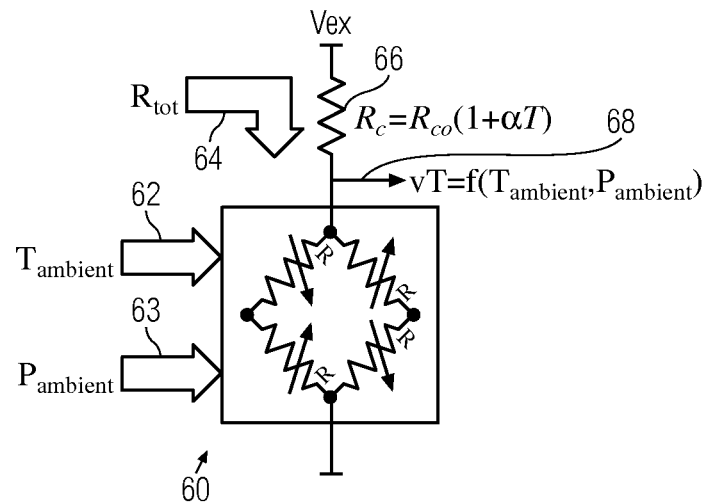
FIG. 6 is a simplified circuit diagram of a configuration for temperature measurement of an unbalanced PRT in accordance with an embodiment of the invention.

FIG. 6 is a simplified circuit diagram of a realistic PRT 60 with temperature measurement 62 and pressure measurement 63 in accordance with an embodiment of the invention. Typically, in PRTs the following behaviour is observed:

$$\Delta R_1 \approx \Delta R_2; \text{ and } \Delta R_3 \approx \Delta R_4$$

However, $$|\Delta R_1|<|\Delta R_4|; \text{ and } |\Delta R_2|<|\Delta R_3|$$

As a result, $R_{tot}$ 64 increases as pressure increases. Since, $$vT=V_{ex} \cdot R_{tot}/(R_{tot}/(R_{tot}+R_c)),$$

Where $R_c=R_{co}(1\alpha T)$ 66, $V_T=f(T_{ambient})$ 68, α is the linear coefficient of temperature of $R_c$, and a voltage applied, such as for example voltage $V_{ex}=1.75V$. This response of $R_{tot}$ and hence vT is inherent in all PRT designs since the compressive and tensile stresses and piezo resistor sensitivities will never be perfectly balanced. It is possible to minimize the magnitude of this effect, however, other aspects of PRT performance is sacrificed as a result, such as a significant reduction in transducer sensitivity.

Figure 7A:
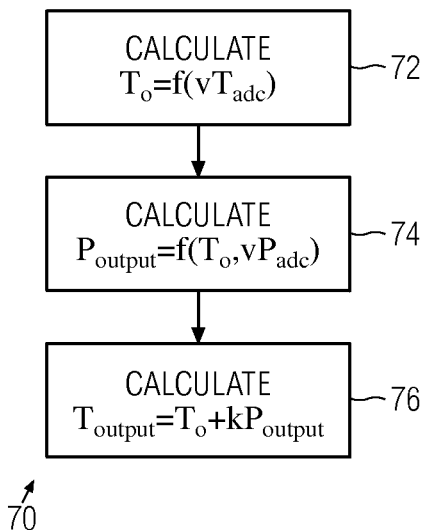
FIG. 7A is a flow chart of calculations for temperature recalibration of a PRT in accordance with an embodiment of the invention.

FIG. 7A is a flow chart 70 of calculations for temperature recalibration of a PRT in accordance with an embodiment of the invention. The calibration process requires three computations instead of the typical two computations as discussed and shown above. The three calibrations include calculating an intermediate or first temperature 72, actual pressure 74, and actual temperature 76 as the following:

$$T_0=f(vT_{adc}); \quad P_{output}=f(T_0, vP_{adc}); \quad \text{and} \quad T_{output}=T_0+kP_{output},$$

respectively. The order of the calculations is provided in accordance with obtaining the necessary parameters, $T_0 \rightarrow P_{output} \rightarrow T_{output}$. The constant k is a constant of actual pressure $P_{output}$ and may be found empirically. An example value for k found empirically is −0.75, where k can be derived by averaging the k value taken from a large number of samples.

Figure 7B:
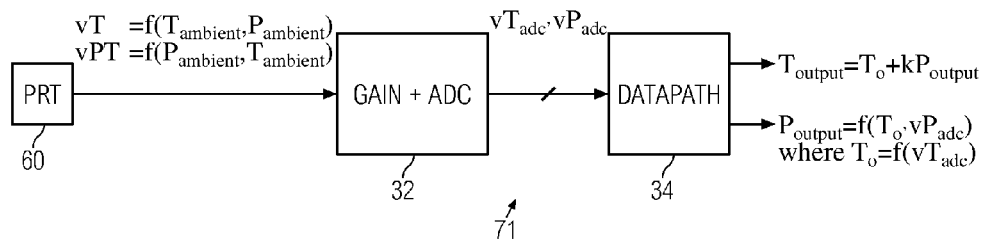
FIG. 7B is a simplified block diagram showing a pressure sensor system in accordance with an embodiment of the invention.

FIG. 7B is a simplified block diagram 71 showing a pressure sensor system in accordance with an embodiment of the invention incorporating the calculations for temperature recalibration of a PRT as shown in the flow chart FIG. 7A.

Figure 8:
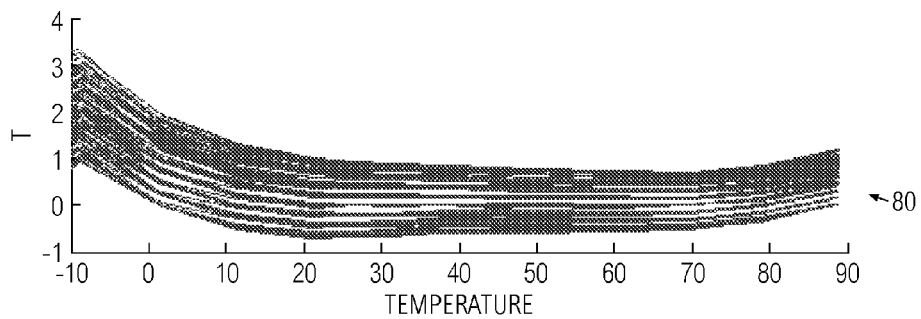
FIG. 8 is a graph of the absolute temperature accuracy of temperature (° C.) for several PRTs without recalibration.
Figure 9:
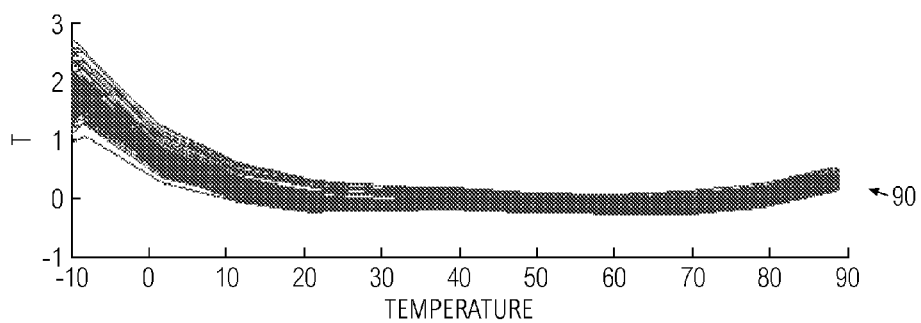
FIG. 9 is a graph of the absolute temperature accuracy of temperature (° C.) for several PRTs with recalibration in accordance with an embodiment of the invention.

For comparison and illustration, FIG. 8 and FIG. 9 show the difference the temperature recalibration has on several PRTs in accordance with an embodiment of the invention. FIG. 8 is a graph 80 of the absolute temperature accuracy of temperature (° C.) without recalibration, with $T_0$. FIG. 9 is a graph 90 of the absolute temperature accuracy of temperature (° C.) with recalibration, with $T=T_0+kP$ in accordance with an embodiment of the invention. The graph of FIG. 8 shows the banding or grouping at different pressures which is eliminated in FIG. 9. The data shown in the graphs of FIG. 8 and FIG. 9 is taken from a sample simulation of 16 PRTs.

Figure 10A:
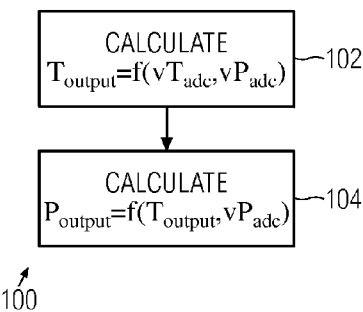
FIG. 10A is a flow chart of calculations for temperature cross-fit of a PRT in accordance with an embodiment of the invention.

FIG. 10A is a flow chart 100 of calculations for temperature cross-fit of a PRT in accordance with an embodiment of the invention. In this calibration process, the pressure dependency is built into the temperature equation. Accordingly, this method requires two computations. The two computations include calculating first temperature which is the actual temperature in this embodiment 102 and actual pressure 104 as the following: $T_{output}=f(vT_{adc},vP_{adc})$; and $P_{output}=f(T_{output}, vP_{adc})$ respectively. The order of the calculations is provided in accordance with obtaining the necessary parameters, $T_{output} \rightarrow P_{output}$. With this method, higher order terms can be achieved then previously in pressure equations. The temperature equation may take the following form:

$$T = cT_0 + cT_1 \cdot T_{adc} + cT_2 \cdot T^2_{adc} + cT_3 \cdot T^3_{adc} + cT_4 \cdot T_{adc} \cdot P_{adc} + cT_5 \cdot P_{adc}$$

The pressure equation may take the following form:

$$P = C_0 + C_1 \cdot P_{adc} + C_2 \cdot T + C_3 \cdot P_{adc} \cdot T$$

The composite pressure equation may take the following form:

$$P_{composite} = C'_0 + C'_1 \cdot P_{adc} + C'_2 \cdot T_{adc} + C'_3 \cdot T^2_{adc} + C'_4 \cdot T^3_{adc} + C'_5 \cdot T_{adc} \cdot P_{adc} + C'_6 \cdot T^2_{adc} \cdot P_{adc} + C'_6 \cdot T^3_{adc} \cdot P_{adc} + C'_7 \cdot T_{adc} \cdot P^2_{adc} + C''_8 \cdot T^2_{adc} \cdot P^2_{adc}$$

Figure 10B:
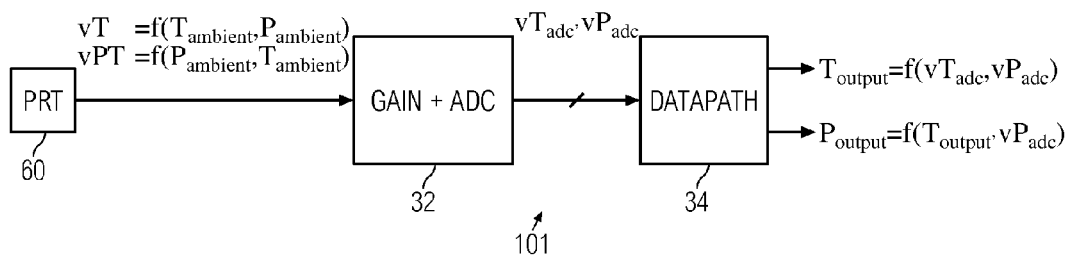
FIG. 10B is a simplified block diagram showing a pressure sensor system in accordance with an embodiment of the invention.

FIG. 10B is a simplified block diagram 101 showing a pressure sensor system in accordance with an embodiment of the invention incorporating the calculations for temperature cross-fit of a PRT where pressure dependency is built into the temperature equation as shown in the flow chart FIG. 10A.

Figure 11:
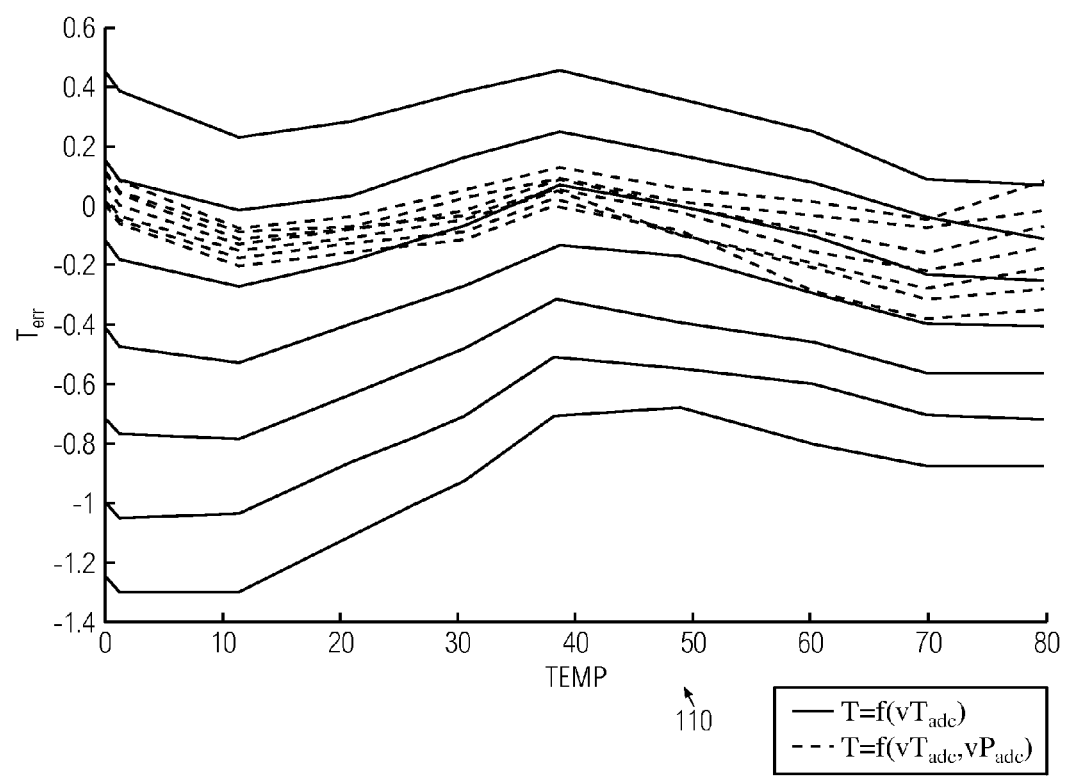
FIG. 11 is a graph of the absolute temperature accuracy of temperature (° C.) for several PRT with temperature cross-fit in accordance with an embodiment of the invention.

FIG. 11 is a graph 110 of the absolute temperature accuracy of temperature (° C.) for a PRT with temperature cross-fit in accordance with an embodiment of the invention. The graph shows the plot of $T_{err}$ curves for $T=f(vT_{adc})$ and $T=f(vT_{adc}, vP_{adc})$ across temperature.

With this method, it is possible to obtain temperature accurately in the semiconductor or integrated circuit such as an application specific integrated circuit (ASIC). Therefore, it is not necessary to fabricate the PRT to be balanced with respect to pressure as done in conventional PRTs. The graph 110 of FIG. 11 also shows that the temperature calculation achieved is better than achieved by conventional methods despite an unbalanced PRT with respect to pressure. Additionally, the overall order of pressure is 2 even though the pressure equation calls for only $1^{st}$ order. This method also results in a savings in datapath calculation 34 over conventional methods, as there are more terms that are realized and considered in the pressure equation.

The above methods described in accordance with embodiments of the invention may be implemented in the sensor system shown and described above with respect to FIG. 3, FIG. 7B and FIG. 10B, and with sensor shown in FIG. 4 and FIG. 5. It will be appreciated that other sensor systems may implement the methods described here in accordance with the aspects and embodiments of the invention.

Embodiments of the invention have been described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by the applicable law. Moreover, any combination of the above-described elements in all possible variations thereof is encompassed by the invention unless otherwise indicated herein or otherwise clearly contradicted by context.

What is claimed is:

1. A method of calibrating a piezo resistive device, comprising:
   providing a piezo resistive element having a fluctuating resistivity in the piezo resistive device;
   receiving, by a processor connected to the piezo resistive element, signals representative of the temperature and pressure readings of the piezo resistive element;
   calculating, by the processor, a first temperature as a function of the signal representative of the temperature reading of the piezo resistive device;
   calculating, by the processor, an actual pressure as a function of the first temperature and the signal representative of the pressure reading of the piezo resistive device; and
   calculating, by the processor, an actual temperature as a function of the first temperature and the actual pressure times a constant (k).

2. The method of claim 1, further comprising empirically determining a value of the constant (k).

3. The method of claim 1, wherein calculating the signal representative of first temperature is a function of the temperature reading and the signal representative of the pressure reading.

4. The method of claim 3, wherein the first temperature is an actual temperature.

5. The method of claim 4, wherein calculating the actual pressure is a function of the actual temperature and the signal representative of the pressure reading of the piezo resistive device.

6. The method of claim 1, wherein the piezo resistive device is arranged within a pressure sensor.

7. The method of claim 1, further comprising providing at least four piezo resistive elements forming the piezo resistive device and each piezo resistive element has a fluctuating resistivity.

* * * * *